(No Model.)  2 Sheets—Sheet 1.

W. R. PATTERSON.
ARMORING LEAD PIPES OF TELEGRAPH CABLES.

No. 248,208. Patented Oct. 11, 1881.

Witnesses.
William S. Granger
William Forrest

Inventor.
William R. Patterson
By George P. Barton
Attorney

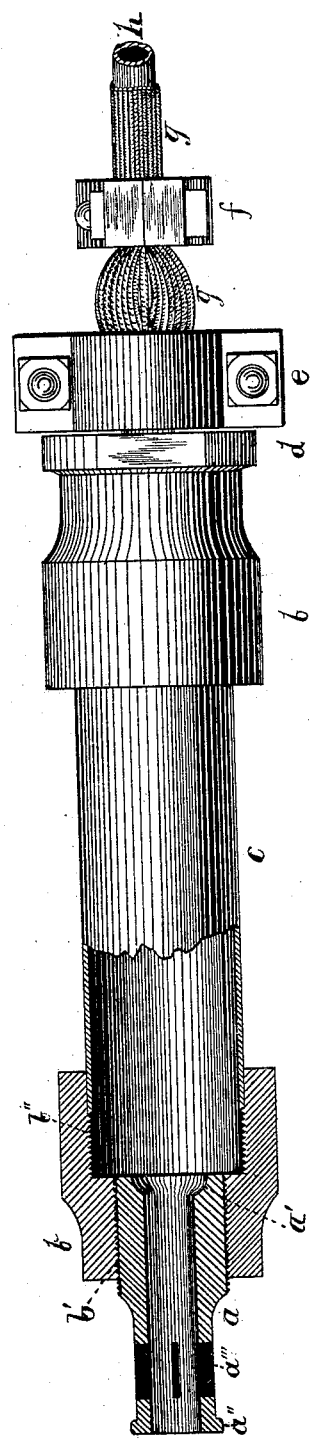

UNITED STATES PATENT OFFICE.

WILLIAM R. PATTERSON, OF CHICAGO, ILLINOIS, ASSIGNOR TO THE WESTERN ELECTRIC MANUFACTURING COMPANY, OF SAME PLACE.

ARMORING LEAD PIPES OF TELEGRAPH-CABLES.

SPECIFICATION forming part of Letters Patent No. 248,208, dated October 11, 1881.

Application filed May 14, 1881. (No model.)

*To all whom it may concern:*

Be it known that I, WILLIAM R. PATTERSON, of Chicago, Illinois, have discovered a new and useful Improvement in Armoring Lead Pipes of Telegraph-Cables, of which the following is a full, clear, concise, and exact description.

The objections to using iron are its rapid oxidation, unless galvanized or protected in some way, and its inflexibility. When galvanized the tools used in laying are liable to abrade the zinc. Lead pipe is preferable on account of its flexibility, and also on account of its durability, as compared with iron pipe when exposed to moisture. Lead, however, in itself, is not tenacious enough to withstand the wear and tear to which telegraph-cables are exposed, and is more flexible than is desirable.

As an improvement on these forms of pipes, I propose to use a lead pipe covered externally with a sheath or armor of galvanized wires of either iron or steel, wrapped helically about the pipe, in the manner and by the means employed in the manufacture of gutta-percha cables. The diameter of the lead pipe is determined by the number of wires desired in the core, and the size of the wires of the protecting-armor by the weight of the pipe and the tensile strain to which it is to be subjected. After being thus prepared, the pipe (by which I mean the lead tube and its iron armor) may be laid in position under ground or under water and the core of conductors drawn in; or, in case a solid insulating substance is desired, the core may be drawn in and the cable coiled up and heated in an oven, or by other suitable means, and when thus heated filled with melted insulating substance. After it has cooled the cable is ready to be laid in place. The pipe combines the durability of lead and the tensile strength of iron or steel. There are no tools used liable to abrade the zinc coating of the wires, and it is not necessary to drag the pipe over the ground, as its flexibility permits of its being coiled upon a reel and uncoiled in place.

Figure 1:
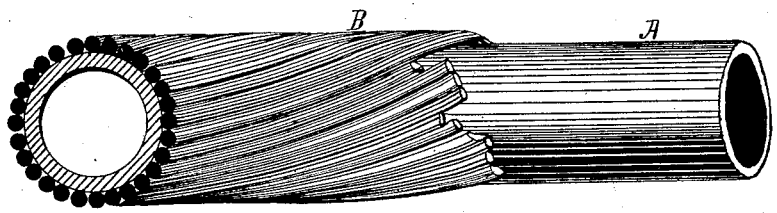

In the drawings, Fig. 1, A is the lead pipe, and B the armor of galvanized wires wound in a long helix.

Figure 2:
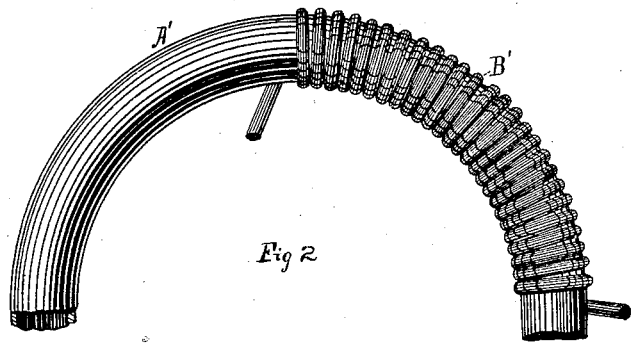

In Fig. 2 the armor is wound in coils nearly at right angles to the axis of the tube. The tensile strength is greater when the wires are applied as shown in Fig. 1, while the flexibility of the pipe is much greater when the wires are applied nearly at right angles to the axis of the pipe, as shown in Fig. 2.

Fig. 3, Sheet 2, is an elevation, partly in section, of a splice which I have used in splicing the pipe and core. The iron piece or thimble $a$ has an interior diameter equal to the exterior diameter of the pipe or cable, and is slipped over the projecting end of the pipe. The end of the pipe is then expanded into the cavity $a'$, and then soldered about said cavity, and also at the shoulder $a''$ and through the slots $a'''$, in any suitable manner, so as to unite the thimble with the pipe and form a tight joint.

The reducing-coupling $b$ is provided with a thread, $b'$, corresponding to the thread of the thimble, and also with the thread $b''$, which corresponds to the thread of the nipple $c$.

$d$ is a lock or jam nut, shown only at the upper end.

$e$ is the large clamp for the sheathing-wires, and $f$ the small clamp.

$g$ shows the armor of iron or steel wires, and $h$ the lead pipe. The core of conductors which is drawn within the lead pipe is not shown.

In case it is necessary to splice both the pipe and core—for example, of a broken cable—I proceed as follows: The lead pipe is cut away so as to leave such a length of core exposed as may be necessary to make room for splicing. Next the armor on each side is turned back and a thimble, $a$, is soldered to each end of the lead pipe. Then the lock-nut $d$, reducing-coupling $b$, and nipple $c$ are screwed back over the thimble and slipped over upon the lead pipe. A similar lock-nut and reducing-coupling are slipped back over the other thimble. The conductors of the core are then spliced and insulated in the usual manner. The nipple, reducing-couplings, and lock-nuts are then screwed together, as shown in the drawings, the splice being covered by the nipple. The armor is then replaced around the lead pipe over the shoulder $a''$, and secured around the small part of the thimble by the large clamp $e$, and the small clamp $f$ is then placed in position upon the cable near the shoulder, as shown. The clamps thus arranged on either side of the shoulder hold the wires securely, so as to prevent strain from coming on the lead pipe.

When the cable is made in sections and the sections are to be united by means of the splice, the thimbles should be soldered to the lead pipe before the core is drawn in, and the length of core necessary to make room for splicing the conductors should be allowed to project through the thimbles, and the end projecting through a thimble should be protected by means of a short piece of pipe provided with a cap.

The armor should be secured by means of clamps, or may be secured by soldering, the ends of a section of pipe being plugged up and immersed in a bath of melted solder before the core is drawn in.

In case two sections of armored pipe are to be spliced so that a single core may be drawn through both when thus united, the thimbles should be placed upon the ends of the sections and the armor secured as heretofore described; and, instead of the two reducing-couplings with the nipple, I use an ordinary coupling only with the lock-nuts.

Two lengths of lead pipe may be united by an ordinary wipe-joint before the armor is applied.

Telegraph-cables protected in this manner may be drawn within sewer-pipes in long lengths, and, in case of injury through accident or otherwise, may be withdrawn for repairs and replaced without disturbing the pavements.

Light aerial cables may be protected with light armor, so as to be drawn over buildings without injury to the pipe.

I claim—

1. The combination of galvanized wires with the lead pipe of a telegraph-cable, said wires being wound helically about the pipe, so as to cover its exterior and form a flexible armor of great tensile strength, substantially as and for the purpose specified.

2. The thimble $a$, provided with the enlargement $a'$, the shoulder $a''$, and slots $a'''$, in combination with the lead pipe of a telegraph-cable expanded into said enlargement, and the galvanized wires of said cable fastened to said thimble by means of clamps or their equivalent, said pipe and thimble being soldered together so as to form a tight joint between them, substantially as and for the purpose specified.

3. The combination, with a telegraph-cable, of the thimbles $a'$, reducing-couplings $b$, nipple $c$, lock-nuts $d$, and large clamps $e$, and small clamps $f$, forming a coupling, substantially as shown and described.

4. The combination of wires with the lead pipe of a telegraph-cable, said wires being wound helically about the pipe, and forming a flexible armor of great tensile strength, substantially as and for the purpose specified.

WILLIAM R. PATTERSON.

Witnesses:
GEORGE P. BARTON,
WILLIAM S. GRANGER.